US011956836B2

(12) United States Patent
Vakil et al.

(10) Patent No.: US 11,956,836 B2
(45) Date of Patent: Apr. 9, 2024

(54) RESOURCE UNIT ALLOCATION BASED ON SERVICE SET IDENTIFIER PRIORITIZATION IN 802.11AX WIRELESS NETWORKS

(71) Applicant: Arista Networks, Inc., Santa Clara, CA (US)

(72) Inventors: Balram Ketan Vakil, Bengaluru (IN); Asvin Kumar Muthurangam, Bengaluru (IN)

(73) Assignee: ARISTA NETWORKS, INC., Santa Clara, CA (US)

(*) Notice: Subject to any disclaimer, the term of this patent is extended or adjusted under 35 U.S.C. 154(b) by 173 days.

(21) Appl. No.: 17/392,186

(22) Filed: Aug. 2, 2021

(65) Prior Publication Data

US 2023/0030603 A1 Feb. 2, 2023

(51) Int. Cl.
*H04W 76/11* (2018.01)
*H04W 72/20* (2023.01)
*H04W 84/12* (2009.01)

(52) U.S. Cl.
CPC ............ *H04W 76/11* (2018.02); *H04W 72/20* (2023.01); *H04W 84/12* (2013.01)

(58) Field of Classification Search
CPC ..... H04W 76/11; H04W 72/20; H04W 84/12; H04W 72/563
See application file for complete search history.

(56) References Cited

U.S. PATENT DOCUMENTS

2010/0182959 A1* 7/2010 Cook .................. H04M 11/062 370/329
2016/0036772 A1* 2/2016 Pratapa ............... H04L 61/5038 709/245
2019/0297632 A1* 9/2019 Huang .................. H04W 84/12
2020/0037335 A1* 1/2020 Killadi .................. H04W 16/14
2020/0120711 A1* 4/2020 Sevin ...................... H04L 5/001
2021/0385733 A1* 12/2021 Zerumsky ............ H04W 88/08
2023/0232385 A1* 7/2023 Huang ................. H04B 7/0452 370/329

* cited by examiner

*Primary Examiner* — Jae Y Lee
(74) *Attorney, Agent, or Firm* — Fountainhead Law Group P.C.

(57) ABSTRACT

Devices, methods, and systems for implementing an 802.11ax communication protocol. A first wireless connection is established between a first device and a network device in association with a first service set identifier. A second wireless connection is established between a second device and a network device in association with a second service set identifier. The network device communicates with the first device over the first wireless connection according to an 802.11ax communication protocol. Full allocation of remaining resource units to the second wireless connection according to the 802.11ax communication protocol is denied based on a priority status of the second service set identifier.

20 Claims, 16 Drawing Sheets

Data Structure
700A

| | 704 | 706 | 708 |
|---|---|---|---|
| | Identifier (MAC, Username, etc.) | Name of the SSID (association ID) | RUs allocated |
| 702-1 | aa:bb:cc:dd:ee:ff | SSID1* (1) | As per availability |
| 702-2 | aa:bb:cc:dd:20:20 | SSID2 (2) | None |
| 702-3 | aa:bb:cc:20:20:21 | SSID1* (3) | As per availability |

FIG. 7A

Data Structure
700B

| | 704 | 706 | 712 | 710 |
|---|---|---|---|---|
| | Identifier (MAC, Username, etc.) | Name of the SSID (association ID) | Threshold Exceeded? | RUs allocated |
| 702-4 | aa:bb:cc:dd:ee:ff | SSID1* (1) | N/A | As per availability |
| 702-5 | aa:bb:cc:dd:10:00 | SSID2 (2) | No | As per availability |
| 702-6 | aa:bb:cc:dd:20:20 | SSID1* (3) | N/A | As per availability |
| 702-7 | aa:bb:cc:20:20:20 | SSID2 (4) | Yes | Allocate 1 RU |

FIG. 7B

RESOURCE UNIT ALLOCATION BASED ON SERVICE SET IDENTIFIER PRIORITIZATION IN 802.11AX WIRELESS NETWORKS

BACKGROUND

The present disclosure relates to network device communications and, more particularly, to allocation of resources in an 802.11ax protocol system.

Provisioning of wireless local area networks (WLANs) in private and public spaces has become nearly ubiquitous in recent years. Network devices may be configured to provide multiple service set identifiers (SSIDs) and each SSID is a connection point for network traffic. For instance, in a commercial office space, different SSIDs may provide connection points for different types of network traffic. In such systems, network traffic of one type may occupy valuable throughput of a network device, limiting the throughput available to network traffic of another type. This is a particularly sensitive issue in network devices capable of operating according to the 802.11ax protocol. In the foregoing example, network traffic of one type connected to an 802.11ax capable network device may reduce or eliminate the benefit of orthogonal frequency-division multiple access (OFDMA) for other types of network traffic. In some circumstances, some computing devices connected to an 802.11ax capable network may have to wait for available OFDMA resource units (RUs).

BRIEF DESCRIPTION OF THE DRAWINGS

With respect to the discussion to follow and in particular to the drawings, it is stressed that the particulars shown represent examples for purposes of illustrative discussion and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings:

FIG. 7A illustrates a first data structure that may be stored in memory of the network device and updated according to one or more embodiments.

FIG. 7B illustrates a second data structure that may be stored in memory of the network device and updated according to one or more embodiments.

DETAILED DESCRIPTION

Described herein are systems, methods, and network devices for dynamically allocating resources in connection with a plurality of SSIDs. In the following description, for purposes of explanation, numerous examples and specific details are set forth in order to provide a thorough understanding of the present disclosure. It will be evident, however, to one skilled in the art that the present disclosure as expressed in the claims may include some or all of the features in these examples, alone or in combination with other features described below, and may further include modifications and equivalents of the features and concepts described herein. The term “set,” as used herein, refers to a non-empty collection of members (e.g., a set of keys). The term “subset,” as used herein, refers to a non-empty collection of members smaller in number than the set referenced relative thereto (i.e., a proper subset).

The present disclosure includes embodiments in which network resources are preserved and dynamically allocated among a plurality of computing devices based on priority statuses of SSIDs with which the plurality of computing devices are respectively associated. A network device provides a plurality of SSIDs through which the computing devices may connect. A first SSID is designated as having a priority status higher than the one or more remaining SSIDs. Allocation of resource units is prioritized to computing devices connected to the first SSID relative to computing devices connected to the remaining SSID(s). Resource unit allocation to computing devices connected to the remaining SSID(s) may be restricted or discontinued until certain criteria related to the first SSID are satisfied. As a result, computing devices associated with the first SSID are granted the benefit of the 802.11ax protocol and OFDMA.

Figure 1:
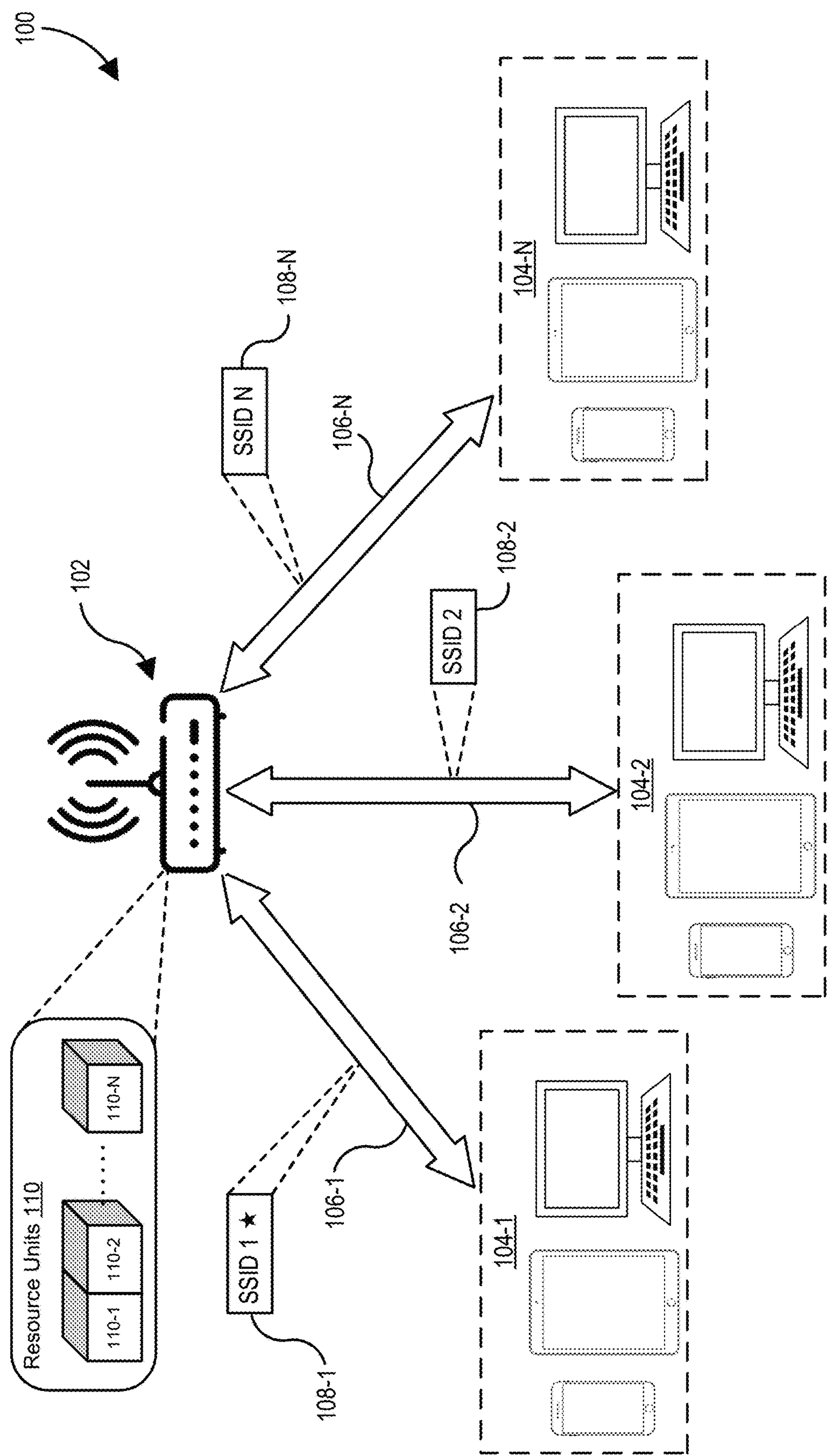
FIG. 1 illustrates an environment in which a network device wirelessly communicates with computing devices via a plurality of service set identifiers according to one or more embodiments.

FIG. 1 illustrates an environment 100 in which a network device 102 wirelessly communicates with a plurality of sets of computing devices 104-1, 104-2, . . . 104-N. The network device 102 is configured to wirelessly communicate with each of the computing devices in the plurality of sets of computing devices 104-1, 104-2, . . . 104-N. The network device 102 may be, by way of non-limiting example, an access point or a wireless router that is configured to act as an intermediary between connected computing devices and one or other remotely located computing devices through an internet service provider. The network device 102 is configured to communicate with the computing devices according to an 802.11ax wireless communication protocol using an OFDMA modulation scheme. The network device 102 may be configured to transmit and receive wireless signals having certain characteristics. More particularly, the network device 102 may be configured to transmit and receive wireless signals in one or more frequency bands, such as the 2.4 GHz frequency band, the 5 GHz frequency band, and/or the 6 GHz frequency band.

The sets of computing devices 104-1, 104-2, . . . 104-N may include mobile devices (e.g., smart phones, tablet computers), laptop computers, desktop computers, internet-of-things devices, sensors, cameras or other such processor-based devices that are configured to wirelessly communicate over a WLAN. Each computing device of the sets of computing devices 104-1, 104-2, . . . 104-N may exchange data with the network device 102 over a wireless network connection. For instance, the set of computing devices 104-1 communicates with the network device 102 via a first set of wireless network connections 106-1, the set of communication devices 104-2 communicates with the network device 102 via a second set of wireless network connections 106-2, and so on. Each wireless network connection is between the network device 102 and an individual computing device of the sets of computing devices 104-1, 104-2, . . . 104-N.

Each set of wireless network connections 106-1, 106-2, . . . 106-N is associated with an SSID that identifies a collection of network connections having the same parameters. The first set of network connections 106-1 are associated with a first SSID 108-1, the second set of network connections 106-2 are associated with a second SSID 108-2, and the Nth set of network connections 106-N are associated with an Nth SSID 108-N. The network device 102 is configured to implement one or more wireless communication protocols to exchange data with the computing devices 104. As described supra, the network device 102 may implement an 802.11ax protocol to communicate with one or more of the sets of computing devices 104-1, 104-2, . . . 104-N.

In connection with the OFDMA modulation scheme, the network device 102 allocates a finite collection of resource units 110-1, 110-2, . . . 110-N (collectively "resource units 110") among the network connections 106 that are configured for communication according to the 802.11ax protocol. In OFDMA, a frequency band in which the network device 102 is operating (e.g., 5 GHz, 6 GHz) is divided into a plurality of channels having a defined bandwidth, which may be preset or may be defined in settings of the network device 102 by an authorized entity (e.g., a network administrator). The channels are further subdivided into the resource units 110 that correspond to subchannels or subcarriers within a channel having a defined bandwidth. As a specific non-limiting example, a frequency band having a 480 MHz bandwidth may be divided into 24 channels that each have a bandwidth of 20 MHz. Each 20 MHz channel may be divided into 9 resource units or sub-channels that each comprise 26 subcarriers having a 78.125 kHz bandwidth. In such a configuration, there would be 9 resource units per channel and a total of 216 of the resource units 110 for a single frequency band. The resource units 110 are allocated among the computing devices 104 that are connected to a network connection configured for OFDMA communication in a given frequency band.

The network device 102 may operate multiple sets of the wireless network connections 104 according to the 802.11ax protocol. One or more of wireless network connections 104 may have a priority status indicating a priority of network traffic on the network connection relative to other network connections. In some embodiments, the 802.11ax enabled wireless connections may have a higher priority status than 802.11ax disabled wireless connections. Among wireless network connections operating according to the 802.11ax protocol, some sets of the wireless network connections 104 may have a higher priority status than other sets of the wireless network connections 104.

As a non-limiting example, the first set of network connections 106-1 and the second set of network connections 106-2 may both be configured for operation according to the 802.11ax protocol. A priority status of the SSID 108-1 associated with the first network connection 106-1 may be designated as having a higher priority than a priority status of the SSID 108-2 associated with the second network connection 106-2. As a result, network traffic of the first set of network connections 106-1 receives a higher resource unit allocation priority than network traffic of the second set of network connections 106-2. The SSID 108-1 may be designated as a connection point for employees whereas the SSID 108-2 may be designated as a connection point for guests. For instance, the SSID 108-1 may be associated with a secure wireless connection for which a user must provide valid credentials (e.g., username & password, fingerprint) to join whereas the SSID 108-2 may be an unsecure wireless connection that is open to all.

The network device 102 may determine how to allocate the resource units 110 among the sets of devices 104 based on a set of criteria, as described in further detail elsewhere herein. In some embodiments, the network device 102 may discontinue allocation of the resource units 110 based on priority status of one or more of the sets of computing devices 104. In some embodiments, the network device 102 may redistribute allocation of the resource units 110 based on a priority status of one or more of the set of devices 104. In some embodiments, the network device 102 may implement different communication protocols for different sets of the computing devices 104 based on a priority status of one or more of the set of devices 104. In some embodiments, the network device 102 may implement different frequency bands for different set of the computing devices 104 based on a priority status of one or more of the set of devices 104.

Figure 2A:
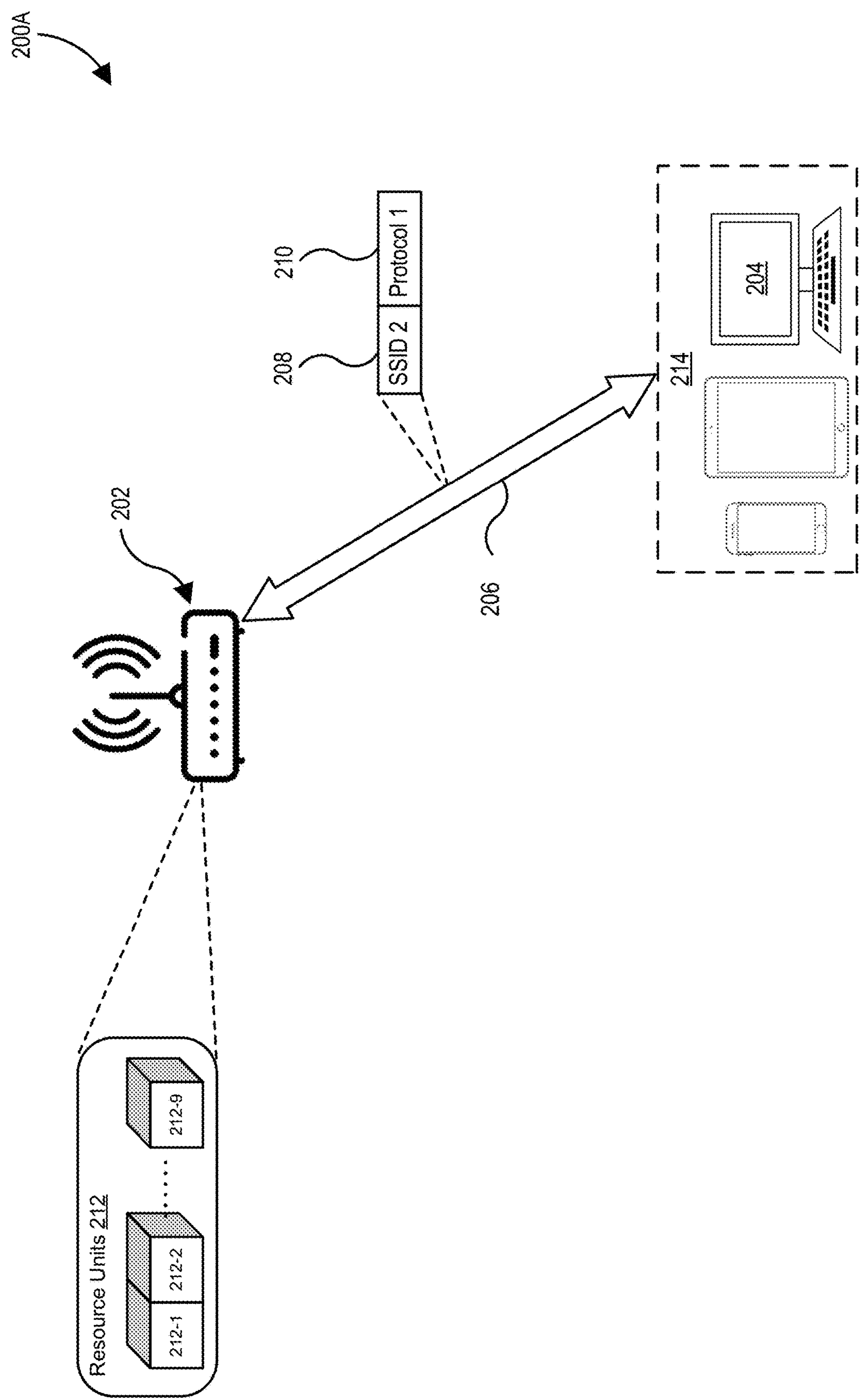
FIG. 2A illustrates an environment at a first time in which a computing device establishes a wireless network connection with a network device according to one or more embodiments.

A first non-limiting example of operation of a network device will now be described with respect to FIGS. 2A through 2F. FIG. 2A illustrates an environment 200A at a first time in which a computing device 204 establishes a wireless network connection 206 with a network device 202. The wireless network connection 206 is associated with an SSID 208. The wireless network connection 206 is configured for communication using a first communication protocol 210, which is the 802.11ax protocol in this example. Prior to establishment of the wireless connection 206, the network device 202 maintains a finite collection of resource units 212 according to the 802.11ax protocol. The finite collection of resource units 212 are unallocated at the first time; however, there may be another set of resource units according to the 802.11ax protocol not shown that the network device 202 allocated to other computing devices not shown. In the non-limiting example shown, there are nine resource units 212-1, 212-2, . . . 212-9; however, the number of available resource units may differ without departing from the scope of the present disclosure. The computing device 204 may be included in a plurality of computing devices 214 associated with the SSID 208 and communicating with the network device 202 via the first communication protocol 210.

Figure 2B:
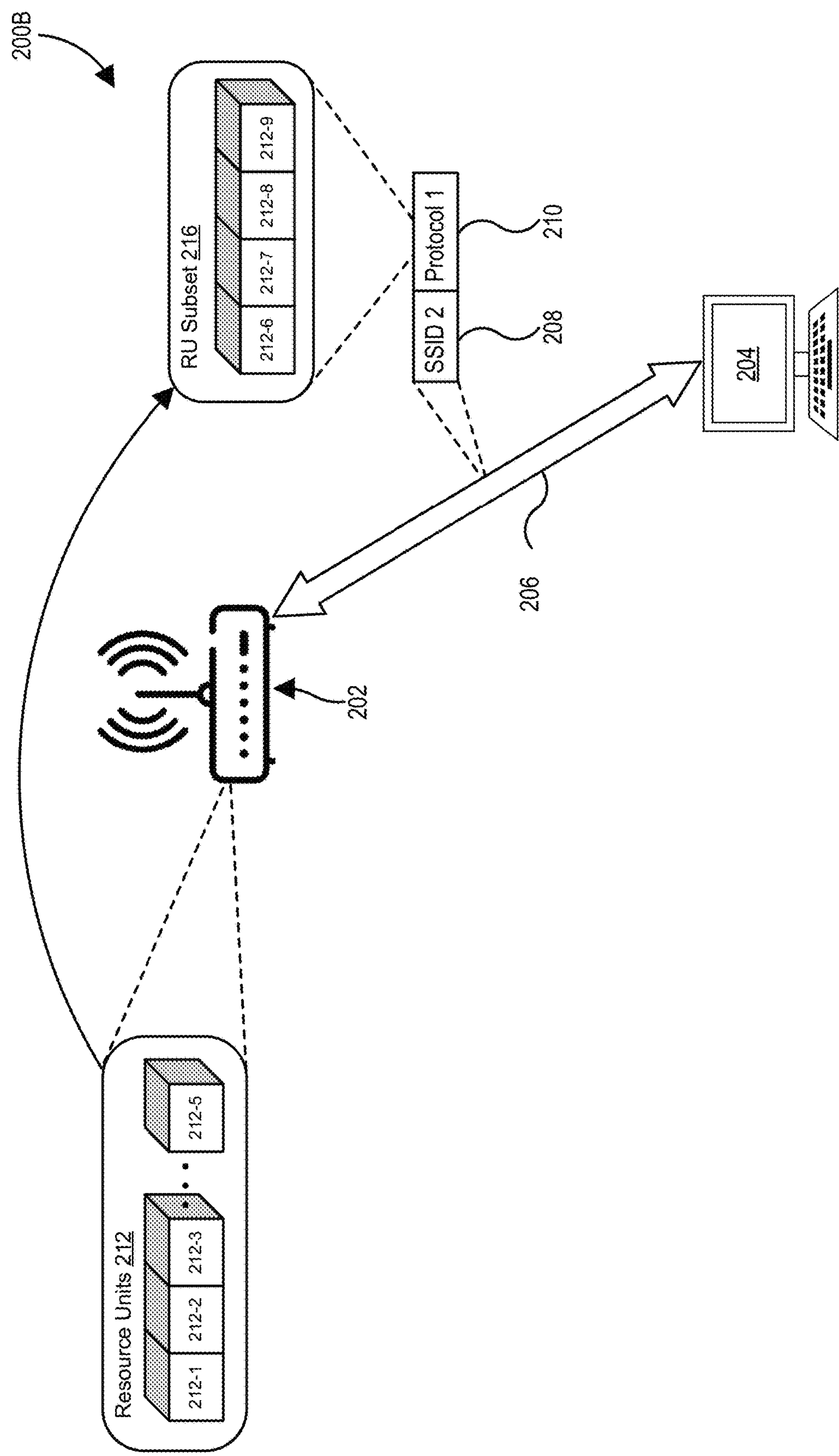
FIG. 2B illustrates an environment at a second time during which the network device of FIG. 2A wirelessly communicates with the computing device according to one or more embodiments.

FIG. 2B illustrates an environment 200B at a second time during which the network device 202 wirelessly communicates with the computing device 204. The second time is subsequent to the first time described with respect to the environment 200A of FIG. 2A. At the second time, the network device 202 allocates a subset 216 of the resource units 212 for communication with the computing device 204 according to the 802.11ax protocol. The number of resource units shown in the resource unit subset 216 is four—the resource units 212-6, 212-7, 212-8, and 212-9 shown. However, this is only for illustrative purposes. The number or amount of resource units included in the subset 216 depends, e.g., on signal strength of the wireless connection 206, amount of data being exchanged between the network device 202 and the computing device 204, number of the plurality of devices 214, and/or data throughput requested by the plurality of devices 214, by way of non-limiting example.

The network device 202 and the computing device 204 communicate in a particular frequency band and, more particularly, the network device 202 and the computing device 204 communicate in four frequency sub-bands of a frequency band. For instance, the network device 202 and the computing device 204 may communicate in a 6 GHz frequency band. The network device 202 may designate, for a given time period, four frequency ranges within the 6 GHz band in which the computing device 204 is to communicate with the network device 202—for instance, four 20 MHz frequency bands between 5.955 GHz and 6.415 GHz. Each of the four frequency sub-bands correspond to one resource unit of the subset of resource units 216.

Figure 2C:
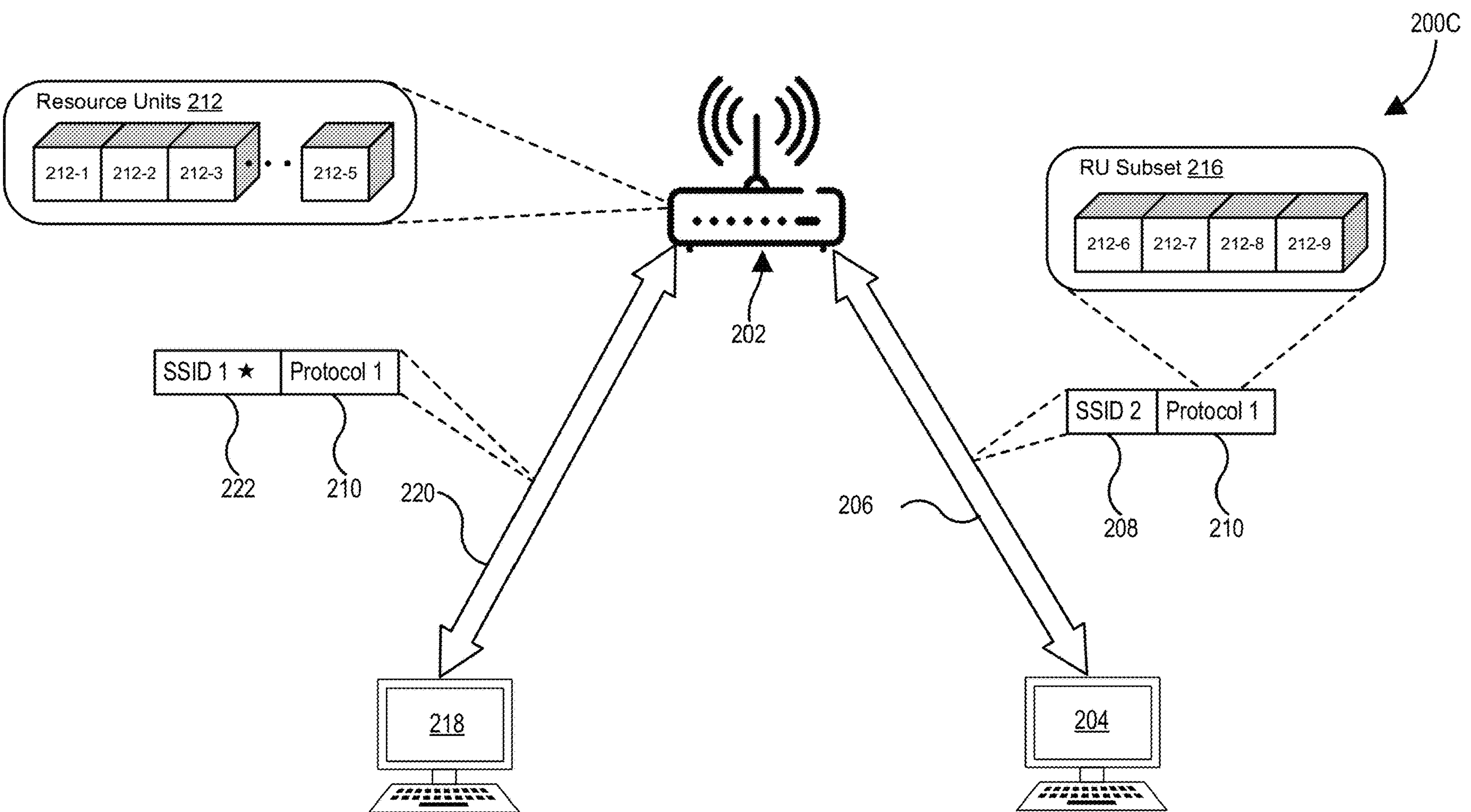
FIG. 2C illustrates an environment at a third time during which the network device of FIG. 2A wirelessly communicates with the computing device according to one or more embodiments.

FIG. 2C illustrates an environment 200C at a third time during which the network device 202 wirelessly communicates with the computing device 204. The third time is subsequent to the second time described with respect to the environment 200B of FIG. 2B. At the third time, a computing device 218 establishes a wireless network connection 220 with the network device 202 in the same frequency band as the SSID 208 (e.g., 6 GHz). The wireless network connection 220 is associated with an SSID 222. The wireless network connection 220 is configured for communication using the first communication protocol 210, which is the 802.11ax protocol in this example.

The SSID 222 has a priority status that is higher than a priority status of the SSID 208. The priority status of each SSID provided by the network device 202 may be designated by an authorized entity, such as a network administrator. As a result of the higher priority status of the SSID 222 relative to the SSID 208, the network device 202 prioritizes allocation of resource units to wireless network connections associated with the SSID 222 over wireless network connections associated with the SSID 208. The SSID 208 and the SSID 220 may have different priority statuses based on the intended class of user for the SSID. For instance, the SSID 220 may be a production SSID for employees whereas the SSID 208 may be a guest SSID for visitors. As another example, the SSID 220 may be an SSID for one group of employees and the SSID 208 may be an SSID for another group of employees. As a further example, the SSID 220 may be an SSID for work computers (e.g., laptops, desktops) and the SSID 208 may be an SSID for mobile devices (e.g., smart phones, tablets).

Figure 2D:
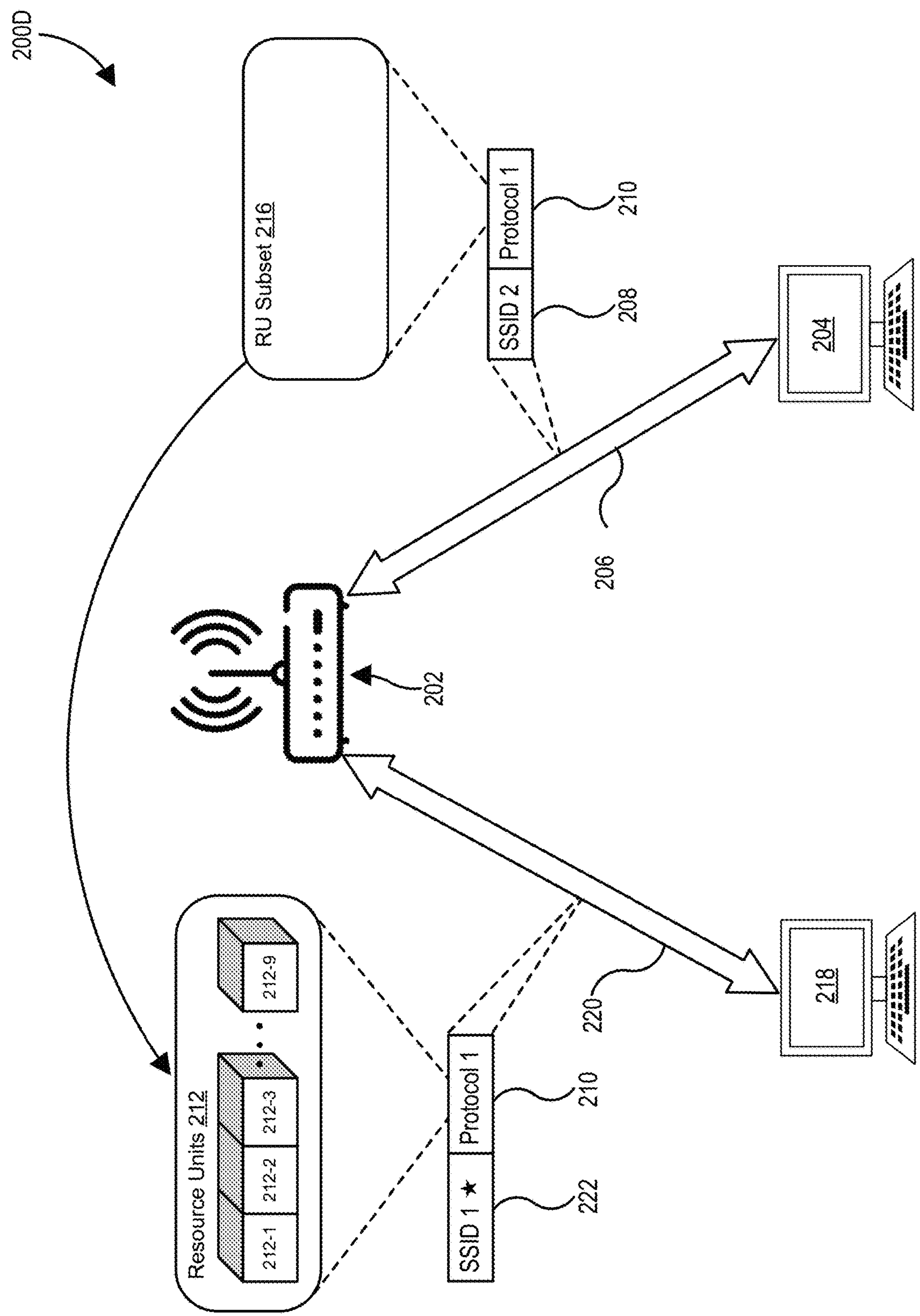
FIG. 2D illustrates an environment at a fourth time during which the network device of FIG. 2A wirelessly communicates with a plurality of computing devices according to one or more embodiments.

FIG. 2D illustrates an environment 200D at a fourth time during which the network device 202 wirelessly communicates with the computing device 204 and the computing device 218. The fourth time of the environment 200D is after the third time of the environment 200C discussed with respect to FIG. 2C. As a result of establishment of the wireless network connection 220 associated with the higher priority SSID 222, the network device 202 adjusts allocation of the finite collection of resource units 212. In particular, the network device 202 deallocates at least some of the subset of resource units 216 from the wireless network connection 206 to the wireless network connection 220. The network device 202 allocates at least some of the collection of resource units 212 to the wireless network connection 220 as appropriate to accommodate communications to and from the computing device 218. The collection of resource units 212 may be reallocated among the computing device 218 and other computing devices that join the SSID 222.

In some embodiments, the network device 202 may delay deallocation of the subset of resource units 216 until a current communication segment is completed, such as until a current sequence of data packets has been communicated to or from the computing device 204. In some embodiments, the network device 202 may gradually deallocate the subset of resource units 216. In some embodiments, the network device 202 may allocate other resources for the wireless network connection 206. For instance, the network device 202 may allocate resources in another communication protocol or another frequency band prior to deallocating the subset of resource units 216.

Figure 2E:
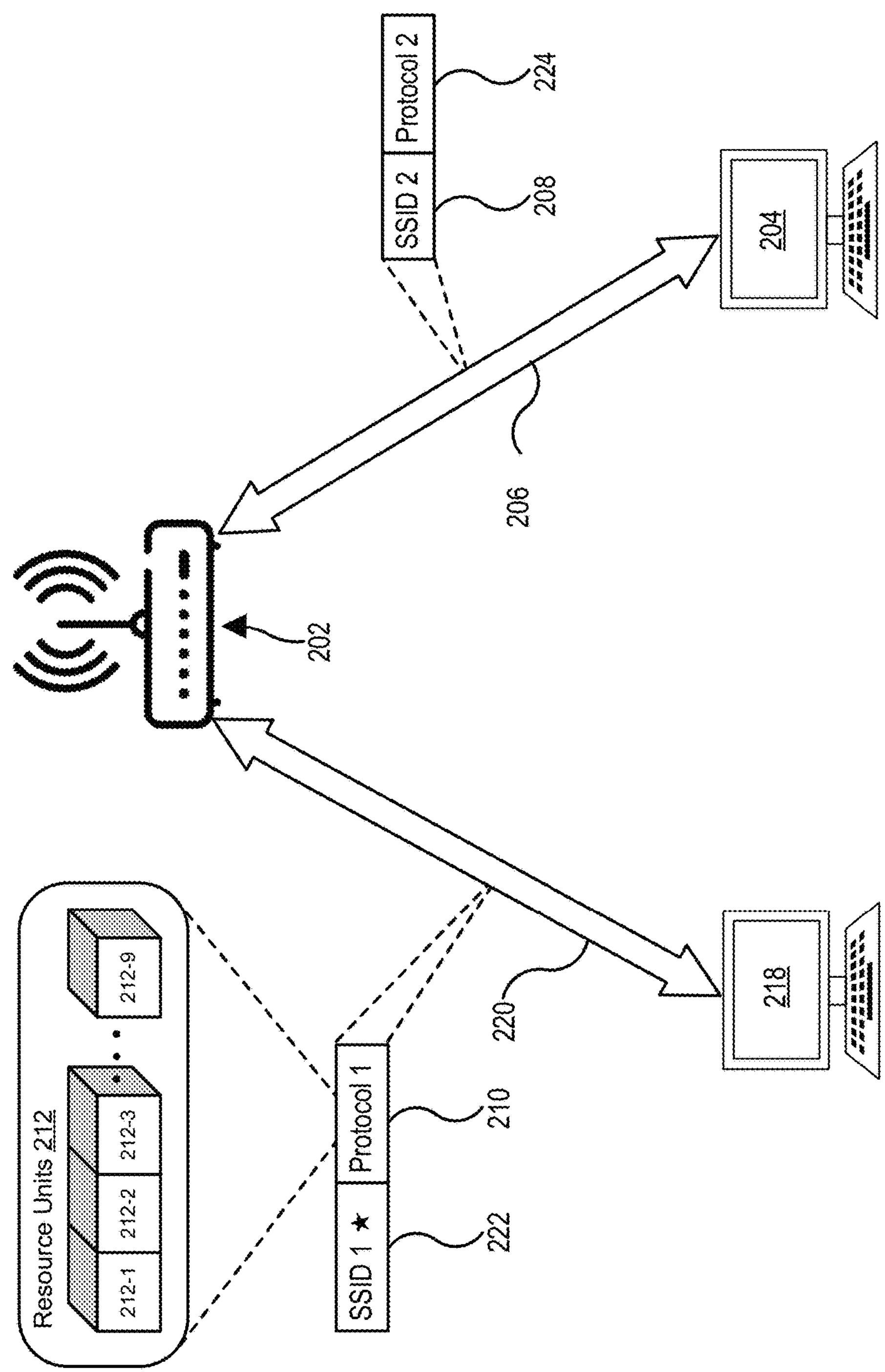
FIG. 2E illustrates an environment at a fifth time during which the network device of FIG. 2A modifies properties of a wireless network connection according to one or more embodiments.

FIG. 2E illustrates an environment 200E at a fifth time during which the network device 202 modifies properties of the wireless network connection 206. The fifth time of the environment 200E is after the fourth time of the environment 200D discussed with respect to FIG. 2D. In some embodiments, the network device 202 may, in connection with the adjustment in resource unit allocation, configure or modify the wireless network connection 206 to have different properties than the first wireless connection. For instance, the network device 202 may change the communication protocol of the wireless network connection 206 to a second communication protocol 224 different than the first communication protocol 210. By way of non-limiting example, the second communication protocol 224 may be the 802.11ac protocol, the 802.11n protocol, or the 802.11g protocol. In some embodiments, the network device 202 may change the frequency band at which the network connection 206 operates. For instance, the network device 202 may change the frequency band of the network connection 206 from 6 GHz to 5 GHz, or from 6 GHz to 2.4 GHz. In such a scenario, the frequency band in which the network connection 206 operates is exclusive to the frequency band in which the network connection 220 operates—for instance, there may be no overlap between the frequency bands of the network connection 206 and the network connection 220. The modified properties of the wireless network connection 206 avoid interference with the collection of resource units 212. In some embodiments, the network device 202 and the computing device 204 may negotiate and agree upon a frequency band, communication protocol, etc., for modifying one or more properties of the network connection 206.

Figure 2F:
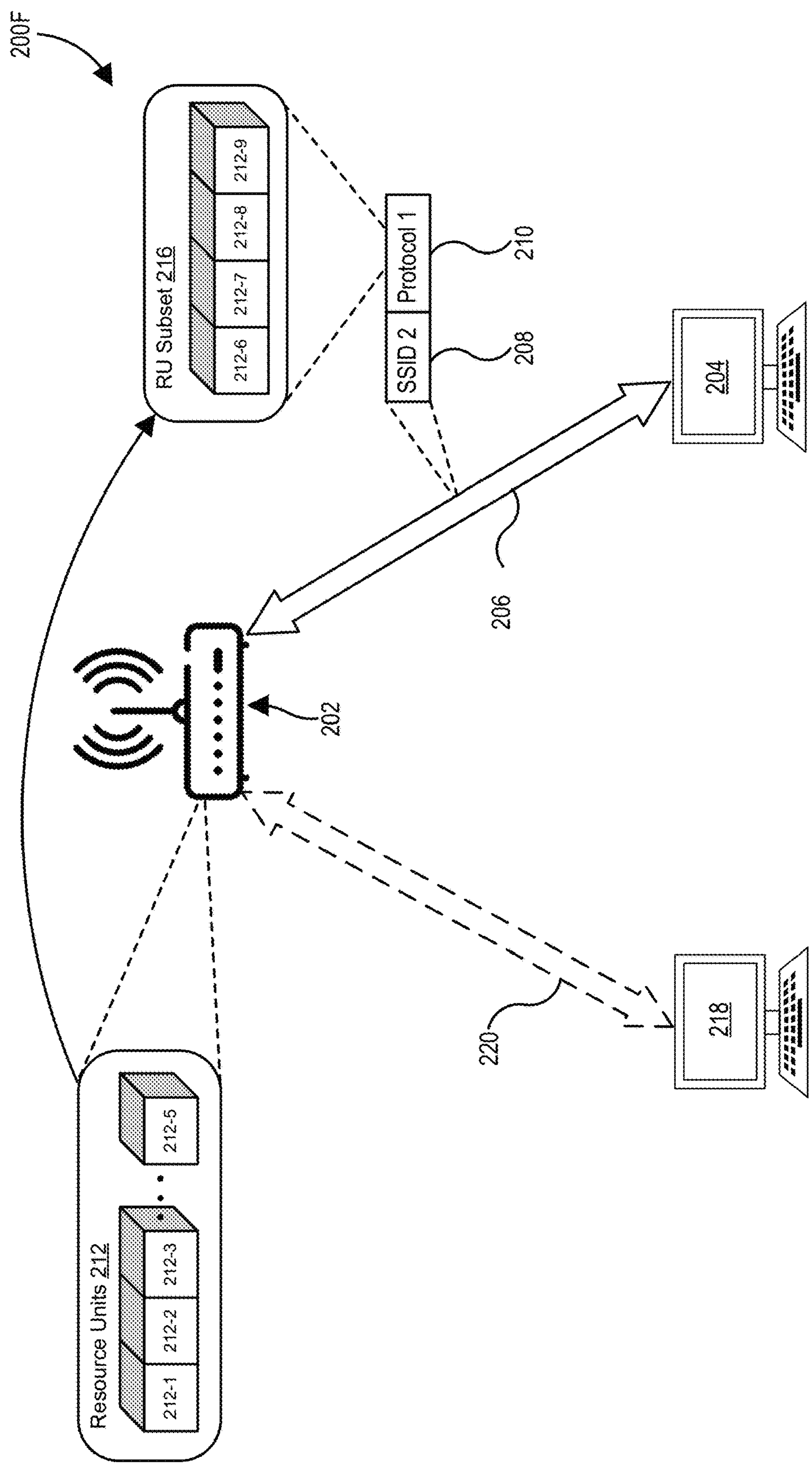
FIG. 2F illustrates an environment at a sixth time during which the network device of FIG. 2A reallocates resource units to the computing device according to one or more embodiments.

FIG. 2F illustrates an environment 200F at a sixth time during which the network device 202 reallocates resource units to the computing device 204. The sixth time is after the fifth time discussed with respect to the environment 200E of FIG. 2E. At or before the sixth time, the wireless network connection 220 or communications cease between the network device 202 and the computing device 218. As a result, the network device 202 modifies the wireless network connection 206 to the first communication protocol 210—for example, the 802.11ax communication protocol. As a result, the network device 202 reallocates the subset of resource units 216 for communication with the computing device 204 via the wireless network connection 206.

Figure 3A:
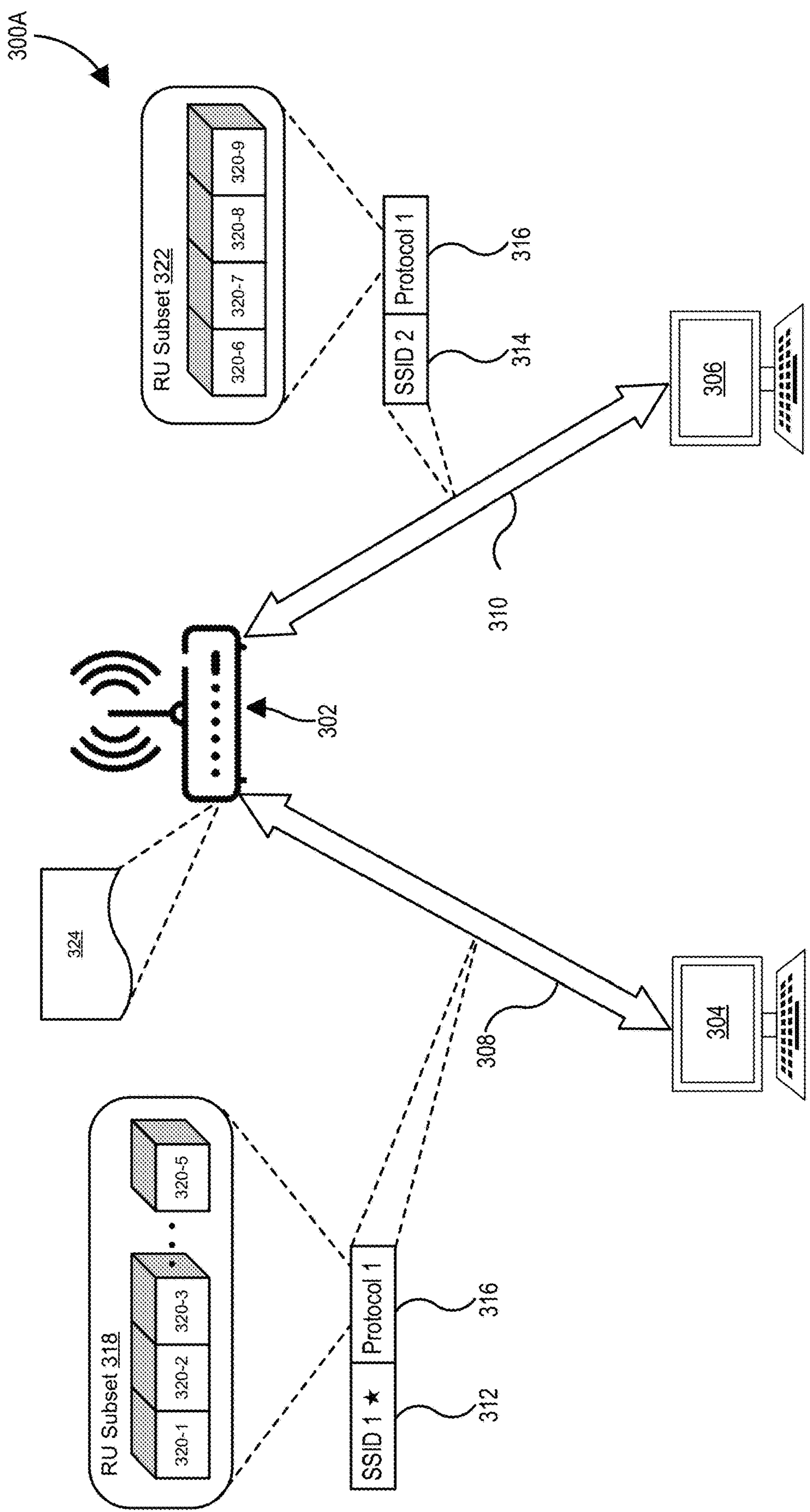
FIG. 3A illustrates an environment at a first time in which a network device wirelessly communicates with a first computing device and a second computing device according to one or more embodiments.
Figure 3B:
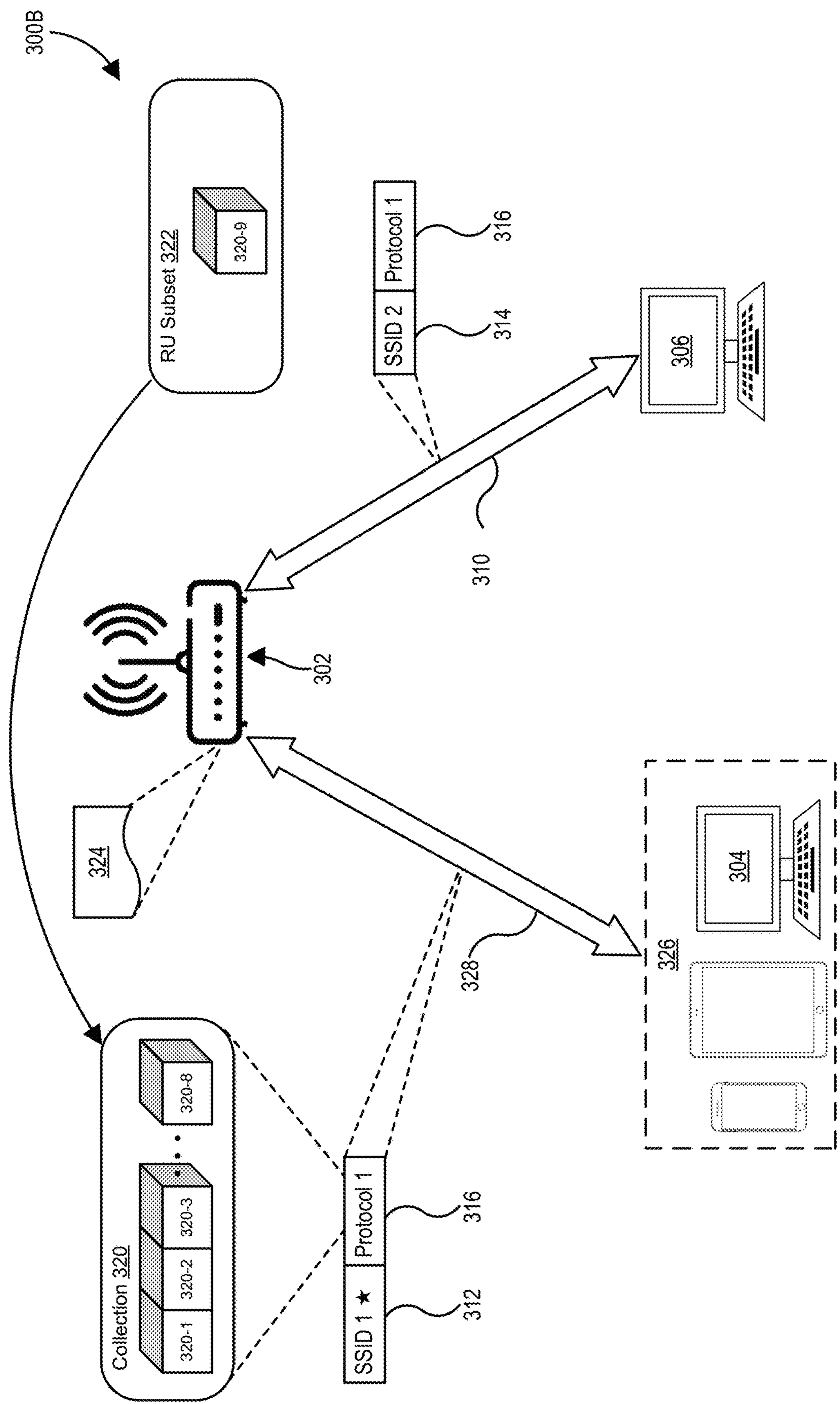
FIG. 3B illustrates an environment at a second time in which the network device of FIG. 3A wirelessly communicates with a plurality of computing devices and the second computing device according to one or more embodiments.
Figure 3C:
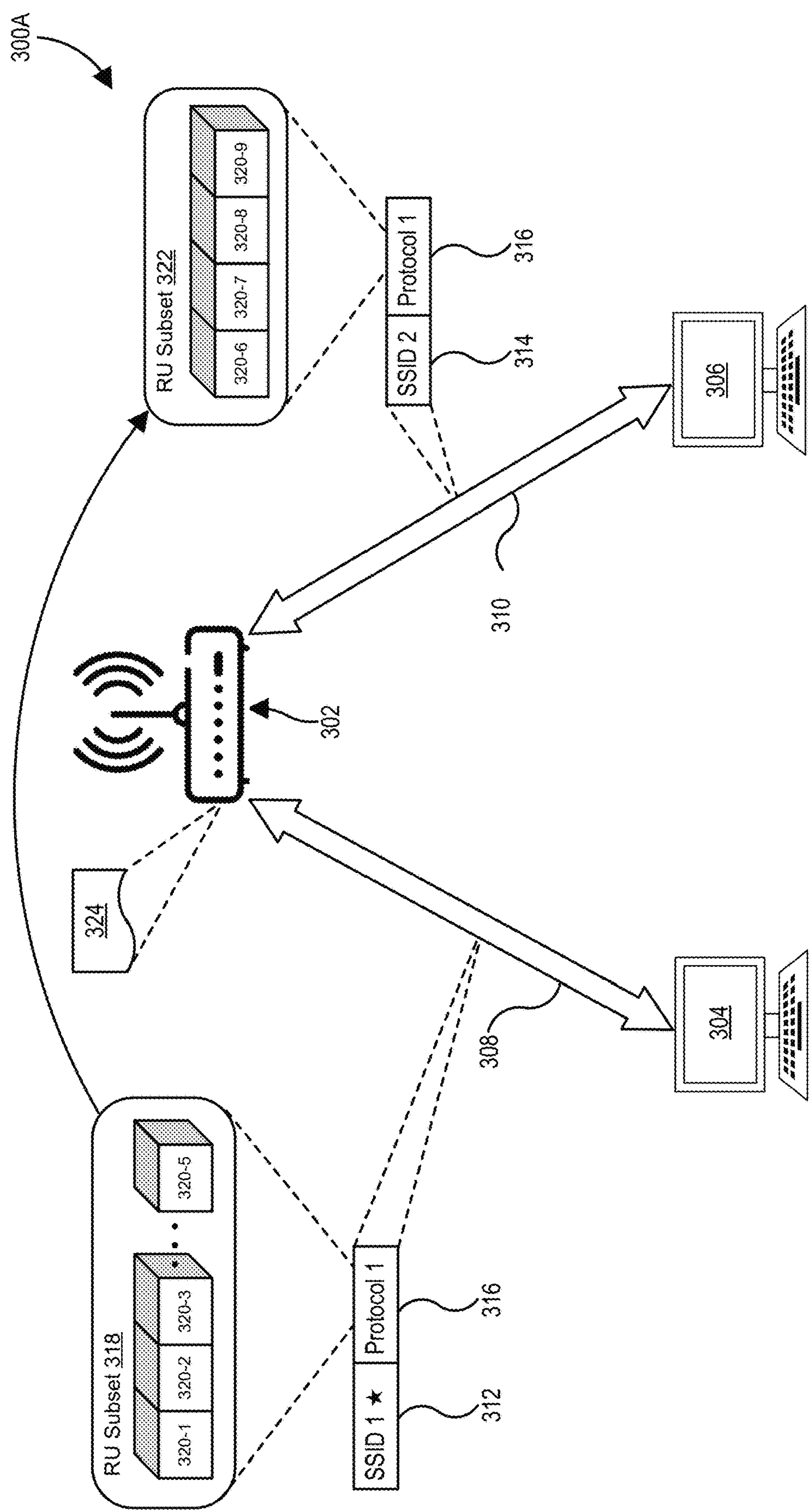
FIG. 3C illustrates an environment at a third time in which the network device of FIG. 3A wirelessly communicates with the second computing device according to one or more embodiments.

A second non-limiting example of operation of a network device will now be described with respect to FIGS. 3A through 3C according to one or more embodiments. Various features discussed with respect to FIGS. 3A through 3C are substantially similar to those discussed with respect to FIGS. 1 and 2A through 2F, so further discussion thereof is omitted for brevity. In the FIGS. 3A through 3C, a defined threshold is established for modifying wireless network connections associated with an SSID having a lower priority status relative to another SSID. FIG. 3A illustrates an environment 300A at a first time in which a network device 302 wirelessly communicates with a first computing device 304 and a second computing device 306. The network device 302 wirelessly communicates with the first computing device 304 via a first wireless network connection 308 and wirelessly communicates with the second computing device 306 via a second wireless network connection 310.

The first wireless network connection 308 is associated with a first SSID 312 and the second wireless network connection 310 is associated with a second SSID 314. The first SSID 312 has a priority status that is higher than a priority status of the second SSID 314. At the first time, the first SSID 312 and the second SSID 314 are both associated with a first communication protocol 316. In this non-limiting example, the first communication protocol 316 is the 802.11ax protocol implemented via an OFDMA modulation scheme.

According to the first communication protocol 316, a first subset 318 of a finite collection of resource units 320-1, 320-2, . . . 320-9 (collectively "collection of resource units 320") is allocated to the first wireless network connection 308 and a second subset 322 of the collection of resource units 320 is allocated to the second wireless network connection 310. The network device 302 stores a set of criteria 324 for determining whether to modify allocation of the collection of resource units 320. For instance, the set of criteria 324 may specify a defined threshold number of computing devices having an established wireless network connection with the network device 302 via the first SSID 312. The set of criteria 324 may include other or additional criteria related to amount of resource units available in a current frequency band, or the availability of resource units in other frequency bands, by way of non-limiting example.

FIG. 3B illustrates an environment 300B at a second time in which a network device 302 wirelessly communicates with a plurality of computing devices 326 and a second computing device 306. The second time is subsequent to the first time discussed with respect to the environment 300A of FIG. 3A. The plurality of computing devices 326 are communicatively coupled with the network device 302 via a plurality of wireless network connections 328 that include the wireless network connection 308 discussed with respect to the environment 300A of FIG. 3A. Each of the wireless network connections 328 is associated with the first SSID 312 and each of the wireless network connections 328 operates according to the first communication protocol 316.

In response to establishment of each of the wireless network connections 328, the network device 302 determines whether one or more of the set of criteria 324 are satisfied. As one example, if the set of criteria 324 includes a defined threshold number of computing devices associated with the first SSID 312, the network device 302 may track the number of computing devices associated with the first SSID 312 and compare the number to the defined threshold number after each new association with the first SSID 312. As a result of the number of associated computing devices exceeding the defined threshold number of computing devices, the network device 302 may deallocate resource units from network connections having a lower priority status than the first SSID 312 and that operate according to the first protocol 316. The network device 302 may, for instance, deallocate some or all of the subset of resource units 322 from the second wireless network connection 310 associated with the SSID 314 (or other lower priority status SSIDs or network connections). In some embodiments, the network device 302 may, in connection with priority status enforcement, allocate a reduced number of resource units to the second wireless connection 310. As shown in the environment 300B, for example, the network device 302 may reduce the resource units allocated to the second wireless connection 310, and the network device 302 may reallocate all of the subset of resource units 322 to the collection 320 except a single resource unit 320-9.

In the environment 300B, the network device 302 allocates all but one resource unit of the collection of resource units 320 to the plurality of wireless network connections 328 as a result of a determination that one or more of the set of criteria 324 are satisfied. In some embodiments, the network device 302 may prevent establishment of additional network connections via the second SSID 314 until the number of current network connections established via the first SSID 312 is below the defined threshold number. In some embodiments, the network device 302 may allocate a reduced number of resource units (e.g., a single resource unit) to any computing devices that connect to the network device 302 via the second SSID 314 according to the first protocol 316. In some embodiments, the network device 302 may modify properties of the second wireless network connection 310, as discussed with respect to the environment 200E of FIG. 2E. The network device 302 may modify the second wireless network connection 310 to operate according to a different communication protocol, modify a frequency band in which the second wireless network connection 310 operates, or in other ways discussed with respect to the environment 200E and elsewhere herein.

FIG. 3C illustrates an environment 300C at a third time in which a network device 302 wirelessly communicates with the second computing device 306. The third time is subsequent to the second time discussed with respect to the environment 300B of FIG. 3B. At the third time, all of the plurality of wireless network connections 328 have been discontinued except for the second wireless network connection 310. After each of the plurality of wireless network connections 328 is discontinued, the network device 302 reevaluates whether one or more of the set of criteria 324 is satisfied. If not, the network device 302 may modify the remaining wireless network connections associated with the second SSID 314 having the relatively lower priority status to operate according to the first communication protocol 316, which is the 802.11ax protocol in this specific example. With respect to the environment 300C, the network device reallocates the subset of resource units 322 of the finite collection of resource units 320 to the second wireless network connection 310. The operations described with respect to FIGS. 3A through 3C reduce or eliminate the likelihood that wireless network connections associated with higher priority status SSIDs will experience interruption or degradation in service due to wireless connections of additional computing devices using a certain communication protocol, such as the 802.11ax protocol.

Figure 4:
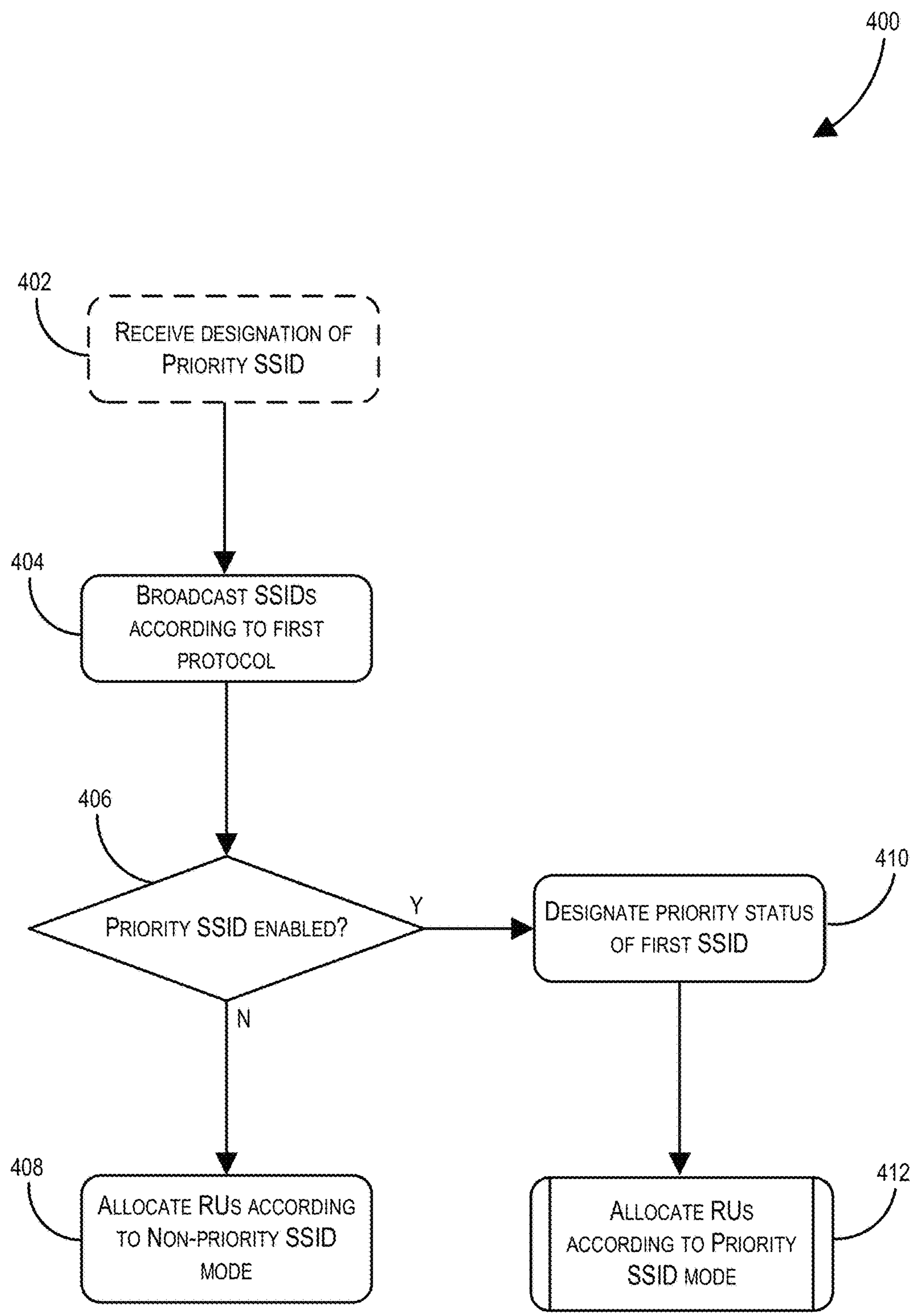
FIG. 4 illustrates a method for determining whether to implement a priority SSID protocol for wireless network connections according to one or more embodiments.

FIG. 4 shows a method 400 for determining whether to implement a priority SSID protocol for wireless network connections according to one or more embodiments herein. The method 400 is performed by one or more devices described herein, such as the network devices 102, 202, and 302. The method 400 may include receiving, at 402, a designation of a priority status for an SSID to be provided by the network device. The designation received in 402 may be a user input from an authorized entity, such as a network administrator, specifying one or more priority statuses of SSIDs to be broadcasted. The designation may, for example, indicate that a first SSID (e.g., SSID for employees) has a higher priority status than a second SSID (e.g., SSID for guests).

The network device may operate wireless network connections associated with SSIDs having a high priority status using higher performance characteristics. For instance, the network device may communicate with computing devices associated with a high priority SSID using a higher throughput density or a higher data rate than computing devices associated with an SSID having a relatively lower priority. The term "throughput density," as used herein, refers to the ratio of total network throughput to the physical area covered by the network. Those of ordinary skill in the art will understand that "throughput" refers to the amount of data transferred to or from a device over a given time period. In some embodiments, the network device may operate wireless network connections associated with an SSIDs having a high priority status according to a first communication protocol (e.g., the 802.11ax protocol at the 6 GHz frequency band) and operate devices associated with an SSID having a relatively lower priority according to a second communication protocol (e.g., the 802.11g protocol at the 2.4 GHz frequency band). As a result of receiving the priority status designation, the network device may operate in a priority SSID mode. The method 400 includes broadcasting, at 404, a plurality of SSIDs according to a first communication protocol. In at least some embodiments, the first communication protocol is the 802.11ax protocol.

At 406, the method 400 includes determining whether a priority SSID mode has been enabled. In particular, at 406, the network device determines whether a designation of a priority status for an SSID was received in 402. If not, the method 400 proceeds to allocate, at 408, resource units according to a non-priority SSID mode. The non-priority SSID mode is one in which resource units are allocated according to the 802.11ax protocol using the OFDMA modulation scheme. In connection with the 802.11ax protocol, the network device allocates resource units according to the 802.11ax protocol.

On the other hand, if the priority SSID mode is enabled as a result of receiving a designation of a priority SSID, the method 400 proceeds to designate, at 410, a priority status of the SSIDs broadcasted. For instance, the network device may maintain a data structure in memory indicating the priority statuses of each SSID broadcasted. The network device may reference the data structure upon receipt of a request to establish a wireless network connection. At 412, the network device allocates resource units according to the priority SSID mode. In the priority SSID mode, the network device may restrict allocation of resource units to wireless connections based on a priority status of an associated SSID. Descriptions of embodiments of the priority SSID mode are described with respect to FIGS. 5 and 6 and elsewhere herein.

Figure 5:
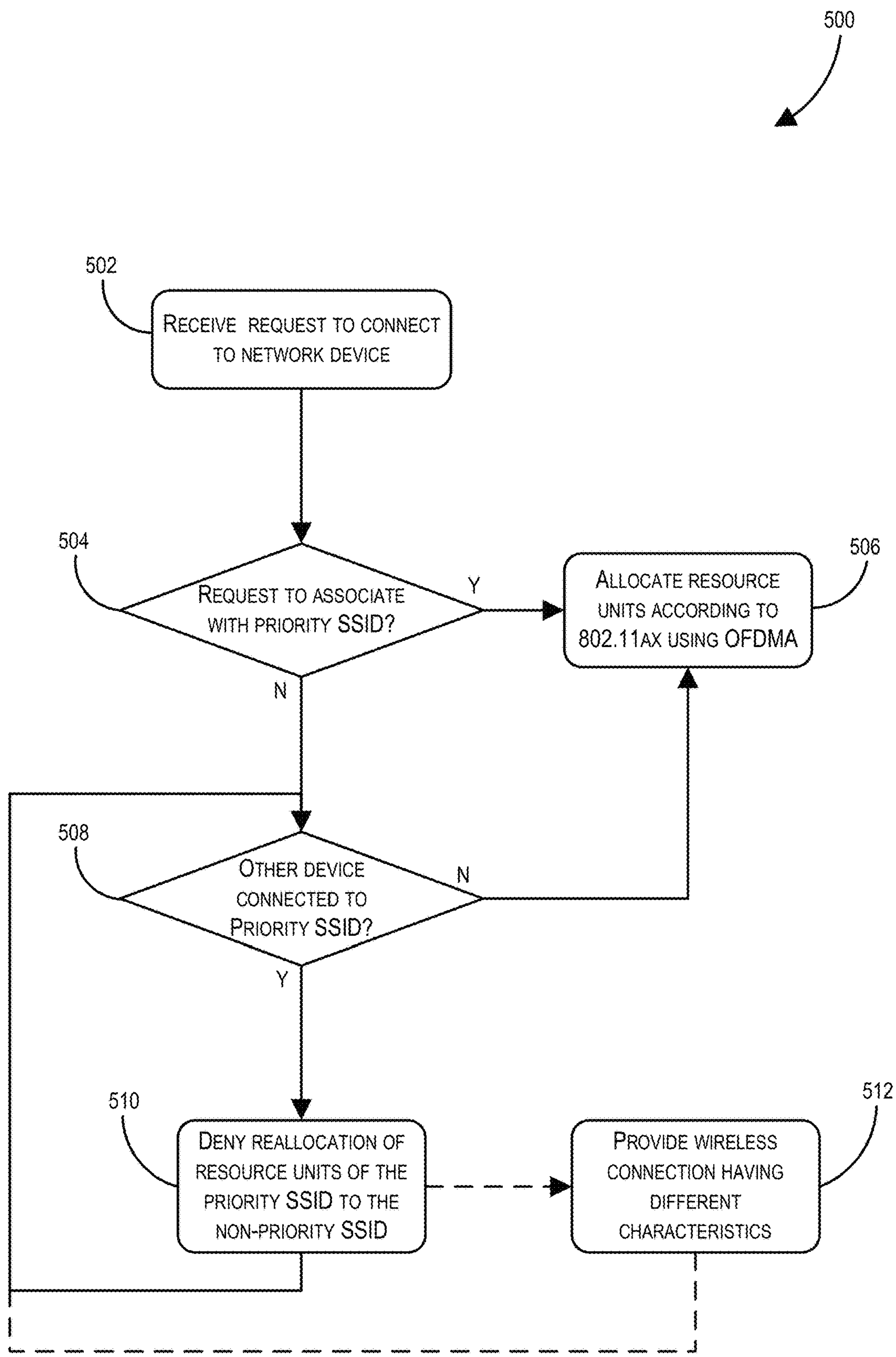
FIG. 5 illustrates a first method for implementing a priority SSID mode of a network device according to one or more embodiments.

FIG. 5 shows a first method 500 for implementing a priority SSID mode of a network device according to one or more embodiments. Performance of the method 500, in some embodiments, is included in allocating, at 412, resource units according to a priority SSID mode. The method 500 includes receiving, at 502, a request from a computing device to connect to the network device. The request received in 502 may include a set of credentials (e.g., username and password, fingerprints), which the network device validates prior to proceeding. At 504, the method 500 includes determining whether the request received in 502 is a request to associate with a priority SSID—for instance, an SSID having a priority status that is higher than a priority status of one or more other SSIDs broadcasted by the network device. The determination in 504 may include evaluating whether the credentials provided are validated and whether the validated credentials are sufficient for associating with the SSID requested. If, at 504, the network device determines that the request received is to connect a computing device in association with a priority SSID, the method 500 proceeds to 506. For example, as discussed with respect to FIG. 2C, the network device 218 may request to connect to the network device 202 in association with the SSID 222. At 506, the method 500 includes establishing a wireless network connection between the requesting computing device and the network device, and includes allocating resource units according to the 802.11ax communication protocol using OFDMA, as discussed herein.

If, at 504, it is determined that the request to connect to the network device does not include a request to associate with a priority SSID (e.g., the SSID 108-1, the SSID 222, the SSID 312), the method 500 proceeds to 508. At 508, the method 500 includes determining whether another device is connected to the priority SSID. If not, the method 500 proceeds to 506, wherein the network device establishes a wireless network connection with the requesting computing device and allocates resource units according to the 802.11ax protocol. For example, as discussed with respect to FIG. 2B, the network device 202 may establish the wireless network connection 206 and allocate resource units for communication with the computing device 204 as needed.

If, at 508, the network device determines that at least one other computing device is associated with the priority SSID, the method 500 includes denying 510 allocation of resource units used by the priority SSID to the wireless network connection requested. Specifically, the network device denies allocation of resource units within the same frequency band or frequency bands that are used in connection with the priority SSID. For instance, if computing devices associated with a priority SSID are provided resource units in the 6 GHz frequency band, the network device may not provide resource units in the 6 GHz frequency band according to the 802.11ax protocol to a wireless network connection to the requesting computing device.

In some embodiments, the network device, at 510, may deny full allocation of resource units to the wireless network connection. The phrase "full allocation of remaining resource units" or "full allocation of resource units," as used herein refers to a number of resource units that would normally be allocated to a computing device according to a given communication protocol, such as the 802.11ax protocol. Denial of full allocation to a computing device is understood to mean that the computing device is allocated an amount of resource units smaller or fewer than would normally be allocated under the communication protocol. For instance, the network device may allocate a reduced or fixed number of resource units to the wireless network connection associated with the non-priority SSID. The method 500 may, subsequent to 510, return to 508 to determine whether another computing device is connected to the priority SSID.

In some embodiments, the network device may provide a wireless network connection having different characteristics than the wireless network connections associated with the priority SSID. For instance, the method 500 may include, at 512, providing a wireless network connection having different characteristics than the wireless network connection with the other computing device associated with the priority SSID. As a non-limiting example, as described with respect to FIGS. 2D and 2E, the network device 202 may deallocate the subset 216 of resource units from the wireless network connection 206. The network device 202 may also change a frequency band of the wireless network connection 206, e.g., from the 6 GHz frequency band to the 5 GHz frequency band, from the 6 GHz band to the 2.4 GHz band. In some embodiments, the network device 202 may change a communication protocol implemented in the wireless network connection 206—for example, by changing the protocol to 802.11ac or 802.11n. The method 500 may, subsequent to 512, return to 508 to determine whether another computing device is connected to the priority SSID.

Figure 6:
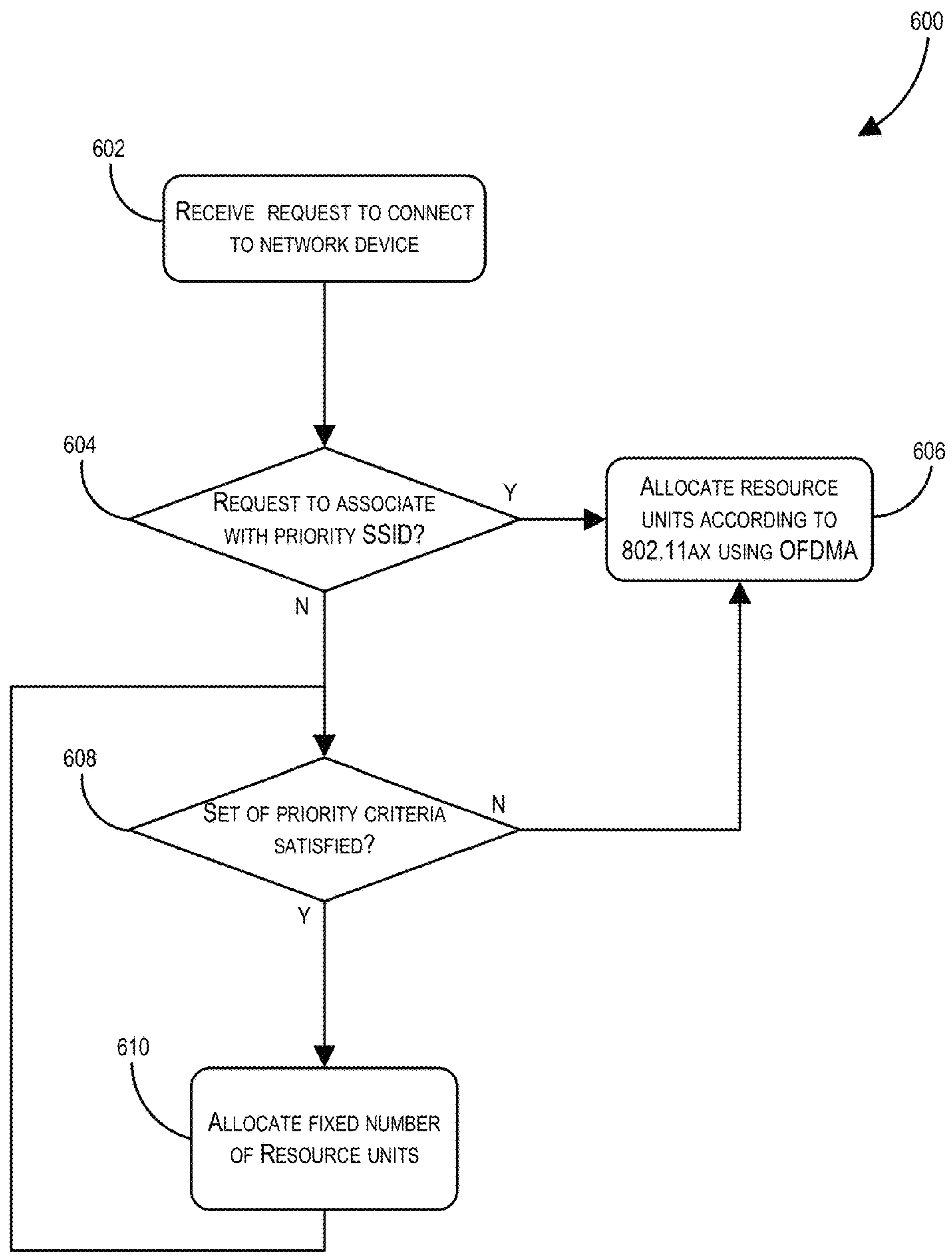
FIG. 6 illustrates a second method for implementing a priority SSID mode of a network device according to one or more embodiments.

FIG. 6 illustrates a second method 600 for implementing a priority SSID mode of a network device according to one or more embodiments. Performance of the method 600, in some embodiments, is included in allocating, at 412, resource units according to a priority SSID mode. Various features described with respect to the method 600 are substantially similar to corresponding features of the method 500, so in-depth discussion is omitted for brevity. The method 600 includes receiving, at 602, a request from a computing device to connect to the network device.

The method 600 also includes determining, at 604, whether the request received in 602 is a request to associate with a priority SSID. If so, the method 600 proceeds to allocate, at 606, resource units according to the 802.11ax protocol using the OFDMA modulation scheme. If not, the method 600 proceeds to determine, at 608, whether a set of priority criteria are satisfied. For instance, with respect to the set of criteria 324 discussed with respect to FIG. 3B, the network device may determine whether a number of computing devices associated with the priority SSID exceeds a defined threshold. The defined threshold may be set as a result of user input provided by an authorized entity. As discussed with respect to FIG. 7 supra, the network device may reference a data structure (e.g., an association table) to determine a number of computing devices associated with the priority SSID.

If, at 608, the network device determines the set of priority criteria are unsatisfied, the method 600 proceeds to allocate, at 606, resource units according to the 802.11ax protocol using the OFDMA modulation scheme. If, at 608, the network device determines that the set of priority criteria are satisfied (e.g., number of computing device associated with the priority SSID exceeds defined threshold), then the method 600 proceeds to allocate, at 610, a reduced number of resource units. The network device may allocate a reduced number of resource units within the frequency band of the priority SSID to the computing device that requested the connection at 602. For instance, the network device may allocate a single resource unit to the computing device requesting connection to an SSID of the network device other than the priority SSID. As a result of the first method 500 and/or the second method 600, adverse performance effects (e.g., throughput, data rate) of the wireless network connections associated with the priority SSID are minimized or eliminated.

In some embodiments, the network device may transition (e.g., in response to user input) between a first priority SSID mode implementing the first method 500 and a second priority SSID mode implementing the second method 600. Operation according to the first method 500 strictly protects allocation of the resource units to reserve resource units in one or more reserved frequency bands for a priority SSID (e.g., 6 GHz). Operation according to the second method 600 limits allocation of resource units to preserve the collection of resource units available for allocation to the priority SSID.

FIG. 7A shows an example data structure 700A that may be stored in memory of the network device and updated based on operations described herein, such as those described with respect to FIGS. 4, 5, and 6. The data structure 700A may be generated and/or updated as a result of implementation of the first method 500. In some embodiments, the data structure 700 is an association table indicating associations of connected computing devices associated with SSIDs of the network device. The data structure, for instance, may include a two-dimensional matrix having rows corresponding to connected computing devices and columns corresponding to entries associated with the connected computing devices. A row of the data structure 700 may be deleted as a result of disconnection of a computing device from the network device.

The data structure 700A includes rows 702-1, 702-2, 702-3, each corresponding to a connected computing device. A first column 704 of the data structure 700 indicates an identifier of the connected computing device, such as a media access control (MAC) address of the computing device or a username provided to connect with the network device. A second column 706 identifies an SSID with which a corresponding connected computing device is associated. A third column 708 indicates the resource units to be allocated according to the 802.11ax protocol. The resource units indicated for allocation in the third column 708 may be in one or more reserved frequency bands (e.g., 6 GHz). Therefore, for computing devices that are not allocated resource units in the third column 708, the network device may communicate with the computing device using other communication protocols (e.g., 802.11ac, 801.11*n*) and/or in other frequency bands (e.g., 2.4 GHz).

As a specific non-limiting example described with respect to the data structure 700A: at a first time, the network device may establish a first network connection with a first computing device having the identifier in the row 702-1 in association with a priority SSID, SSID1, as shown in the second column 706. As indicated in the third column 708, the network device may allocate resource units to the first computing device as available according to the standard 802.11ax protocol. At a second time, the network device may establish a second network connection with a second computing device having the identifier in the row 702-2 in association with a non-priority SSID, SSID2. The network device may deny allocation of resource units to the second computing device because the first computing device is already connected to the network device in association with the priority SSID. At a third time, the network device may establish a third network connection with a third computing device having the identifier in the row 702-3 in association with the priority SSID. The network device may allocate resource units to the third computing device as available according to the standard 802.11ax protocol because the third computing device is associated with the priority SSID.

The data structure 700A may include (e.g., in the third column 708) an association identifier indicating a relative order in which wireless connections were established for the computing devices. For a given SSID, computing devices having higher association identifiers may receive priority for allocation of resource units relative to computing devices having lower association identifiers. For example, the network device may prioritize allocation of resource units to the first computing device over the third computing device based on the higher association identifier of the first computing device relative to the third computing device.

FIG. 7B shows an example data structure 700B that may be stored in memory of the network device and updated based on operations described herein, such as those described with respect to FIGS. 4, 5, and 6. The data structure 700B may be generated and/or updated as a result of implementation of the second method 600. Some features of the data structure 700B are substantially similar to the data structure 700A, so further description thereof is omitted for brevity.

The data structure 700B includes rows 702-4, 702-5, 702-6, 702-7, each corresponding to a connected computing device. The data structure 700B also includes a third column 712 indicating whether a defined threshold for a number of connected devices to a priority SSID is exceeded. In this specific non-limiting example, the defined threshold is one; however, the defined threshold may be modified to a different value by an authorized user. The network device may store a value indicating a number of computing devices associated with the priority SSID. The network device compares the stored value indicating the number of priority SSID connected computing devices. The network device may compare the stored value with the defined threshold in response to a computing device connecting to the network device in association with the non-priority SSID. At a first time, the network device establishes a network connection with a first computing device having the identifier in the row 702-4 in association with the priority SSID. Because the first computing device is associated with the priority SSID, the network device allocates resource units to the first computing device according to the 802.11ax protocol.

At a second time, the network device establishes a network connection with a second computing device having the identifier in the row 702-5 in association with the non-priority SSID. Because the stored value does not exceed the defined threshold, the network device allocates resource units to the second computing device according to the 802.11ax protocol. At a third time, the network device establishes a network connection with a third computing device having the identifier in the row 702-6 in association with the priority SSID. The network device increments a value stored in memory that indicates the number of computing devices associated with a priority SSID to one (1) and compares the value to the defined threshold. Because the third computing device is associated with the priority SSID, the network device allocates resource units to the third computing device according to the 802.11ax protocol.

At a fourth time, the network device establishes a network connection with a fourth computing device having the identifier in the row 702-7 in association with the non-priority SSID. The network device compares the value stored in memory indicating the number of connected computing devices to the defined threshold. Because the value exceeds the defined threshold of one, the network device denies full allocation of the remaining resource units to the fourth computing device that would otherwise be distributed according to the 802.11ax protocol. For instance, as indicated in the third column 710, the network device may allocate only a single resource unit to the network connection with the fourth computing device. In some embodiments, the network device may also reduce allocation of resource units to other computing devices associated with the priority SSID as a result of the number of computing devices associated with the priority SSID exceeding the defined threshold. For example, in response to association of the fourth computing device with the priority SSID, the network device may reduce allocation of resource units to the second computing device to a single resource unit.

Figure 8:
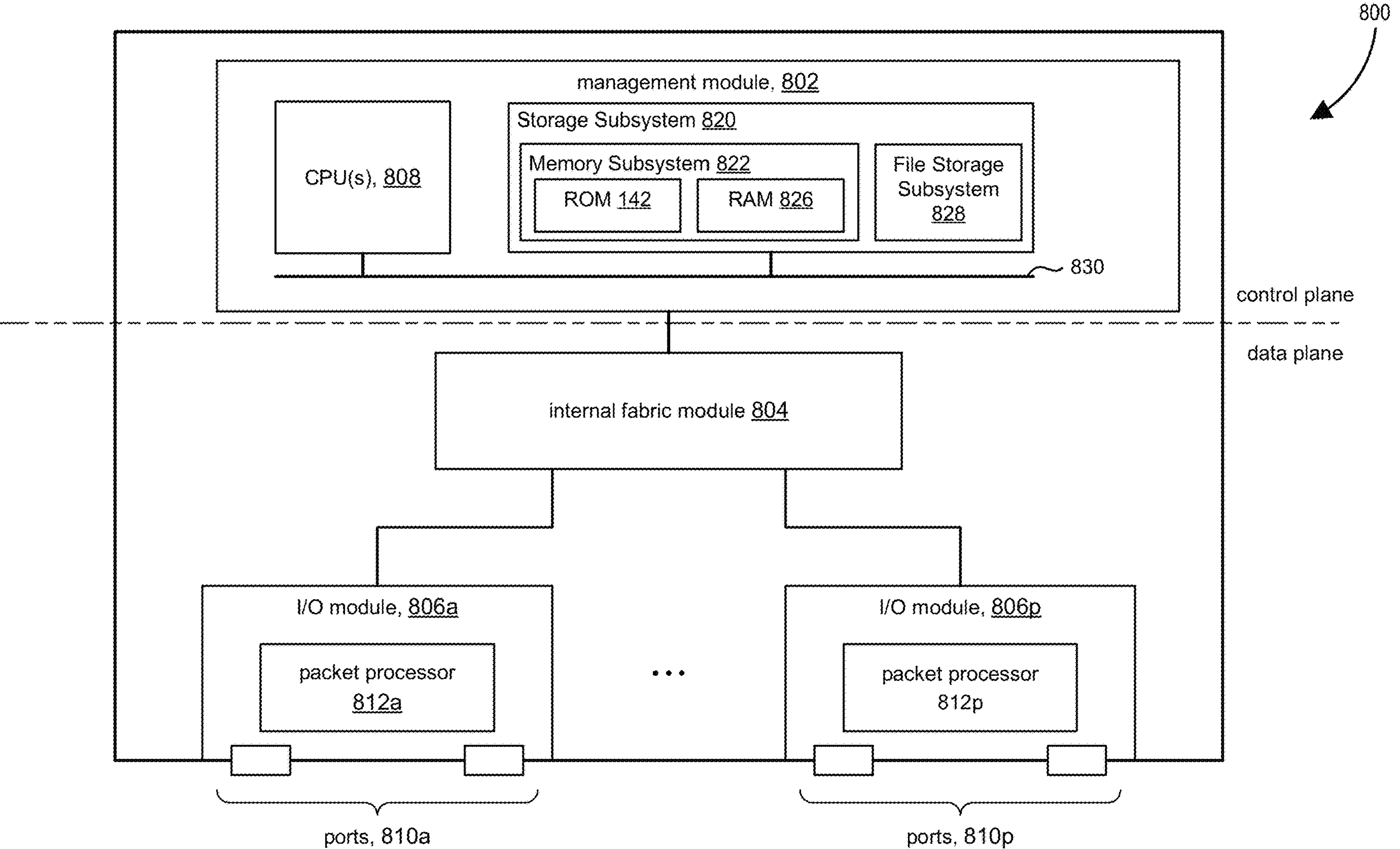
FIG. 8 illustrates a network device 800 that can be adapted according to one or more embodiments of the present disclosure.

FIG. 8 illustrates a network device 800 that can be adapted according to one or more embodiments of the present disclosure. The network device 800 may be a switch or a router, for example. As shown, network device 800 can include a management module 802, an internal fabric module 804, and a number of I/O modules 806*a*-806*p*. The management module 802 may be disposed in a control plane (also referred to as control layer) of the network device 800 and can include one or more management CPUs 808 for managing and controlling operation of network device 800 in accordance with the present disclosure. Each management CPU 808 can be a general purpose processor, such as an Intel®/AMD® x86-64 or ARM® processor, that operates under the control of software stored in memory, such as a storage subsystem 820, which may include read-only memory 828 and/or random access memory 826. In some embodiments, the CPU 808 may include control circuitry, and may include or be coupled to a non-transitory storage medium storing encoded instructions that cause the CPU 808 to perform operations described herein. In some embodiments, the non-transitory storage medium may include encoded logic or hardwired logic for controlling operation of the CPU 808. The control plane refers to all the functions and processes that determine which path to use, such as routing protocols, spanning tree, and the like.

Internal fabric module 804 and I/O modules 806*a*-806*p* collectively represent the data plane of network device 800 (also referred to as data layer, forwarding plane, etc.). Internal fabric module 804 is configured to interconnect the various other modules of network device 800. Each I/O module 806*a*-806*p* includes one or more input/output ports 810*a*-810*p* that are used by network device 800 to send and receive network packets. Each I/O module 806*a*-806*p* can also include a packet processor 812*a*-812*p*. Each packet processor 812*a*-812*p* can comprise a forwarding hardware component configured to make wire speed decisions on how to handle incoming (ingress) and outgoing (egress) network packets. In some embodiments, the forwarding hardware can comprise an application specific integrated circuit (ASIC), a field programmable array (FPGA), a digital processing unit, or other such collection of configured logic.

Embodiments disclosed herein include a method comprising designating, for a wireless network, a first priority status of a first service set identifier of a wireless network device; establishing a first wireless connection between a first device and the wireless network device via the first service set identifier according to an 802.11ax communication protocol; allocating a first set of resource units to the first device based on the 802.11ax communication protocol as a result of a first association of the first device with the first service set identifier; establishing a second wireless connection between a second device and the wireless network device via a second service set identifier according to the 802.11ax communication protocol; and denying full allocation of remaining resource units to the second device as a result of the first association and a second association of the second device with the second service set identifier.

In some embodiments, the method comprises allocating a second set of resource units to the second device as a result of the first association and the second association, wherein the first set of resource units includes a greater amount of resource units than the second set of resource units. In some embodiments, the method comprises determining that the first wireless connection is discontinued; and allocating a third set of resource units to the second device as a result of determining that the first wireless connection is discontinued, wherein the third set of resource units includes a greater amount of resource units than the second set of resource units.

In some embodiments, the method comprises communicating with the first device over the first wireless connection according to a first wireless communication protocol; and communicating with the second device over the second wireless connection according to a second wireless communication protocol, the first wireless communication protocol providing a throughput density that is higher than a throughput density of the second wireless communication protocol.

In some embodiments, the method comprises establishing a third wireless connection between a third device and the wireless network device via the first service set identifier; and allocating a second set of resource units to the third device according to the 802.11ax communication protocol as a result of a third association of the third device with the first service set identifier.

In some embodiments, the method comprises receiving instructions by an authorized entity to designate the first priority status of the first service set identifier as having a higher priority than a second priority status of the second service set identifier.

In some embodiments, the method comprises, as a result of establishing the second wireless connection, determining that a number of computing devices associated with the second service set identifier exceeds a defined threshold, wherein denying full allocation of the remaining resource units is as a result of determining that the number of computing devices exceeds the defined threshold.

In some embodiments, the method includes denying allocation of any resource units in a frequency band of the first service set identifier to the second device.

In some embodiments, the method comprises configuring the second wireless connection to have different properties than the first wireless connection.

Embodiments disclosed herein also include a network device comprising a wireless transceiver configured to communicate at least via an Orthogonal Frequency-Division Multiple Access (OFDMA) modulation scheme; and one or more processors configured to: establish a first wireless connection between a first device and the network device in association with a first service set identifier; communicate, via the wireless transceiver, with the first device over the first wireless connection according to an 802.11ax communication protocol; establish a second wireless connection between a second device and the network device in association with a second service set identifier; and deny full allocation of remaining resource units to the second wireless connection according to the 802.11ax communication protocol based on a priority status of the second service set identifier.

In some embodiments, the one or more processors of the network device are configured to: permit full allocation of the remaining resource units to the first wireless connection based on a priority status of the first service set identifier.

In some embodiments, the one or more processors of the network device are configured to: determine, at a first time, that a number of devices associated with the second service set identifier exceeds a defined threshold, wherein full allocation of the remaining resource units is denied to the second wireless connection as a result of determining that the number of computing devices exceeds the defined threshold. In some embodiments, the one or more processors of the network device are configured to: determine, at a second time subsequent to the first time, that the number of devices associated with the second service set identifier does not exceed the defined threshold; and permit full allocation of the remaining resource units to the second wireless connection based on the determination that the number of devices does not exceed the defined threshold.

In some embodiments, the one or more processors of the network device are configured to: deny allocation of any resource units of the 802.11ax protocol to the second wireless connection based on the priority status of the second service set identifier.

In some embodiments, the one or more processors of the network device are configured to: configure the second wireless connection to have a different set of properties than the first wireless connection.

Embodiments disclosed herein further include a non-transitory computer readable medium encoding instructions that, as a result of execution by control circuitry, cause the control circuitry to: designate a first priority status of a first service set identifier as having a higher priority than a second priority status of a second service set identifier; establish a first wireless connection with a first device according to an 802.11ax protocol, the first wireless connection associated with the first service set identifier; establish a second wireless connection with a second device, the second wireless connection associated with the second service set identifier; allocate a first set of resource units to the first wireless connection as a result of the first priority status, the first set of resource units allocated based on the 802.11ax protocol; and restrict allocation of resource units to the second wireless connection as a result of the second priority status and establishment of the first wireless connection.

In some embodiments, execution of the instructions stored on the non-transitory computer readable medium causes the control circuitry to: update a data structure to indicate a first association between the first device and the first service set identifier, indicate a second association between the second device and the second service set identifier, and indicate a restricted status for allocation of resource units to the second wireless connection.

In some embodiments, execution of the instructions stored on the non-transitory computer readable medium causes the control circuitry to: determine, at a first time, that the first wireless connection is discontinued; and remove, at a second time subsequent to the first time, restrictions on allocation of resource units to the second wireless connection as a result of discontinuation of the first wireless connection.

In some embodiments, execution of the instructions stored on the non-transitory computer readable medium causes the control circuitry to: establish a third wireless connection with a third device, the third wireless connection associated with the second service set identifier; determine, as a result of establishment of the third wireless connection, that a number of devices associated with the second service set identifier exceeds a defined threshold; and allocate a second set of resource units to the second wireless connection, the second set of resource units being a smaller amount of resource units than the first set of resource units.

In some embodiments, execution of the instructions stored on the non-transitory computer readable medium causes the control circuitry to: allocate a second set of resource units to the second wireless connection, the second set of resource units being a smaller amount of resource units than the first set of resource units.

The foregoing description illustrates various embodiments of the present disclosure along with examples of how aspects of the present disclosure may be implemented. The above examples and embodiments should not be deemed to be the only embodiments and are presented to illustrate the flexibility and advantages of the present disclosure as defined by the following claims. Based on the above disclosure and the following claims, other arrangements, embodiments, implementations and equivalents may be employed without departing from the scope of the disclosure as defined by the claims.

What is claimed is:

1. A method comprising:

designating, for a wireless network, a first priority status for a first service set identifier of a wireless network device, the first priority status intended for a first class of users;

establishing a first wireless connection between a first device and the wireless network device via the first service set identifier according to an 802.11ax communication protocol;

allocating a first set of resource units to the first device based on the 802.11ax communication protocol as a result of associating the first device with the first service set identifier, wherein the wireless network device communicates over a frequency bandwidth that is divided into a plurality of channels, wherein each channel is divided into a plurality of subchannels, wherein each resource unit corresponds to a sub-channel of one of the channels;

establishing a second wireless connection between a second device and the wireless network device via a second service set identifier according to the 802.11ax communication protocol, wherein a second priority status is designated for the second service set identifier and intended for a second class of users, wherein the second priority status is lower in priority than the first priority status by virtue of the first class of users having higher priority than the second class of users; and denying full allocation of remaining resource units to the second device as a result of the second priority status being lower in priority than the first priority status.

2. The method of claim 1 comprising:

allocating a second set of resource units to the second device, wherein the first set of resource units includes a greater amount of resource units than the second set of resource units.

3. The method of claim 2 comprising:

determining that the first wireless connection is discontinued; and allocating a third set of resource units to the second device as a result of determining that the first wireless connection is discontinued, wherein the third set of resource units includes a greater amount of resource units than the second set of resource units.

4. The method of claim 1 comprising:

communicating with the first device over the first wireless connection according to a first wireless communication protocol; and communicating with the second device over the second wireless connection according to a second wireless communication protocol, the first wireless communication protocol providing a throughput density that is higher than a throughput density of the second wireless communication protocol.

5. The method of claim 1 comprising:

establishing a third wireless connection between a third device and the wireless network device via the first service set identifier; and allocating a second set of resource units to the third device according to the 802.11ax communication protocol as a result of associating the third device with the first service set identifier.

6. The method of claim 1 comprising:

receiving instructions by an authorized entity to designate the first priority status of the first service set identifier as having a higher priority than the second priority status of the second service set identifier.

7. The method of claim 1 comprising:

as a result of establishing the second wireless connection, determining that a number of computing devices associated with the second service set identifier exceeds a defined threshold, wherein denying full allocation of the remaining resource units is as a result of determining that the number of computing devices exceeds the defined threshold.

8. The method of claim 1, wherein denying full allocation of the remaining resource units to the second device includes denying allocation of any resource units in a frequency band of the first service set identifier to the second device.

9. The method of claim 1 comprising:

configuring the second wireless connection to have different properties than the first wireless connection.

10. A network device comprising:

a wireless transceiver configured to communicate at least via an Orthogonal Frequency-Division Multiple Access (OFDMA) modulation scheme; and one or more processors configured to:

establish a first wireless connection between a first device and the network device in association with a first service set identifier that is intended for use with a first class of users;

communicate, via the wireless transceiver, with the first device over the first wireless connection according to an 802.11ax communication protocol using resource units allocated from a plurality of resource units, wherein the network device communicates over a frequency bandwidth that is divided into a plurality of channels, wherein each channel is divided into a plurality of subchannels, wherein each resource unit corresponds to a sub-channel of one of the channels;

establish a second wireless connection between a second device and the network device in association with a second service set identifier that is intended for use with a second class of users; and deny full allocation of remaining resource units to the second wireless connection according to the 802.11ax communication protocol by virtue of the first class of users having a higher priority than the second class of users.

11. The network device of claim 10, the one or more processors configured to:

permit full allocation of the remaining resource units to the first wireless connection by virtue of the first service set identifier being associated with the first class of users.

12. The network device of claim 10, the one or more processors configured to:

determine, at a first time, that a number of devices associated with the second service set identifier exceeds a defined threshold, wherein full allocation of the remaining resource units is denied to the second wireless connection as a result of determining that the number of computing devices exceeds the defined threshold.

13. The network device of claim 12, the one or more processors configured to:

determine, at a second time subsequent to the first time, that the number of devices associated with the second service set identifier does not exceed the defined threshold; and permit full allocation of the remaining resource units to the second wireless connection based on the determination that the number of devices does not exceed the defined threshold.

14. The network device of claim 10, the one or more processors configured to:

deny allocation of any resource units of the 802.11ax protocol to the second wireless connection by virtue of the second service set identifier being associated with the second class of users.

15. The network device of claim 10, the one or more processors configured to:

configure the second wireless connection to have a different set of properties than the first wireless connection.

16. A non-transitory computer readable medium in a wireless network device, the non-transitory computer readable medium encoding instructions that, as a result of execution by control circuitry, cause the control circuitry to:

designate a first priority status for a first service set identifier that is intended for use with a first class of users, and a second priority status for a second service set identifier that is intended for use with a second class of users, wherein the first class of users has a higher priority than the second class of users;

establish a first wireless connection with a first device according to an 802.11ax protocol, the first wireless connection associated with the first service set identifier;

establish a second wireless connection with a second device, the second wireless connection associated with the second service set identifier;

allocate a first set of resource units to the first wireless connection as a result of the first priority status, the first set of resource units allocated based on the 802.11ax protocol, wherein the wireless network device communicates over a frequency bandwidth that is divided into a plurality of channels, wherein each channel is divided into a plurality of subchannels, wherein each resource unit corresponds to a sub-channel of one of the channels; and restrict allocation of resource units to the second wireless connection by virtue of the second wireless connection being associated with the second class of users.

17. The non-transitory computer readable medium of claim 16, wherein execution of the instructions causes the control circuitry to:

update a data structure to indicate a first association between the first device and the first service set identifier, indicate a second association between the second device and the second service set identifier, and indicate a restricted status for allocation of resource units to the second wireless connection.

18. The non-transitory computer readable medium of claim 16, wherein execution of the instructions causes the control circuitry to:

determine, at a first time, that the first wireless connection is discontinued; and remove, at a second time subsequent to the first time, restrictions on allocation of resource units to the second wireless connection as a result of discontinuation of the first wireless connection.

19. The non-transitory computer readable medium of claim 16, wherein execution of the instructions causes the control circuitry to:

establish a third wireless connection with a third device, the third wireless connection associated with the second service set identifier;

determine, as a result of establishment of the third wireless connection, that a number of devices associated with the second service set identifier exceeds a defined threshold; and allocate a second set of resource units to the second wireless connection, the second set of resource units being a smaller amount of resource units than the first set of resource units.

20. The non-transitory computer readable medium of claim 16, wherein execution of the instructions causes the control circuitry to:

allocate a second set of resource units to the second wireless connection, the second set of resource units being a smaller amount of resource units than the first set of resource units.

* * * * *